(12) United States Patent
Murdock

(10) Patent No.: US 8,763,360 B2
(45) Date of Patent: Jul. 1, 2014

(54) HOLLOW FAN BLADE TUNING USING DISTINCT FILLER MATERIALS

(75) Inventor: James R. Murdock, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/288,250

(22) Filed: Nov. 3, 2011

(65) Prior Publication Data

US 2013/0111907 A1    May 9, 2013

(51) Int. Cl.
```
F02K 9/00      (2006.01)
F02C 3/00      (2006.01)
A23L 3/18      (2006.01)
F01D 5/14      (2006.01)
F01D 5/18      (2006.01)
```

(52) U.S. Cl.
USPC ......... 60/226.1; 60/796; 416/231 B; 416/235; 416/236 R; 416/500

(58) Field of Classification Search
USPC .............. 416/231 R, 231 B, 235, 236 R, 500; 60/226.1, 796
See application file for complete search history.

(56) References Cited

U.S. PATENT DOCUMENTS

| | | | |
|---|---|---|---|
| 4,118,147 A * | 10/1978 | Ellis ............................. | 416/230 |
| 5,931,641 A * | 8/1999 | Finn et al. .................. | 416/229 A |
| 5,940,764 A * | 8/1999 | Mikami ...................... | 455/456.6 |
| 6,033,186 A * | 3/2000 | Schilling et al. ............... | 416/233 |
| 6,039,542 A * | 3/2000 | Schilling et al. ............... | 416/233 |
| 7,147,437 B2 | 12/2006 | Burdgick et al. | |
| 7,278,830 B2 | 10/2007 | Vetters | |
| 7,334,997 B2 | 2/2008 | Karafillis | |
| 8,172,541 B2 * | 5/2012 | Cairo ......................... | 416/229 R |
| 2004/0151592 A1 * | 8/2004 | Schreiber .................. | 416/231 R |
| 2007/0134085 A1 * | 6/2007 | Daly et al. ................. | 415/198.1 |
| 2007/0292274 A1 * | 12/2007 | Burdgick et al. .......... | 416/229 A |
| 2008/0253887 A1 * | 10/2008 | Cairo et al. .................... | 415/221 |
| 2010/0004369 A1 | 1/2010 | Desai et al. | |
| 2010/0143097 A1 * | 6/2010 | Read et al. ...................... | 415/119 |
| 2010/0266415 A1 * | 10/2010 | Viens et al. .................... | 416/226 |
| 2011/0081249 A1 | 4/2011 | Read | |

FOREIGN PATENT DOCUMENTS

WO    2006082479 A1    8/2006

\* cited by examiner

Primary Examiner — Phutthiwat Wongwian
Assistant Examiner — William Breazeal
(74) Attorney, Agent, or Firm — Carlson, Gaskey & Olds, PC

(57) ABSTRACT

A fan blade comprises a main body extending between a leading edge and a trailing edge. Channels are formed into the main body, with a plurality of ribs extending intermediate the channels. The fan blade has a dovetail, and an airfoil extending radially outwardly from the dovetail. Material is deposited within the channels, with one type of material being selected to provide additional stiffness to the fan blade, and a second type of material being selected for having good damping characteristics. A method and gas turbine engine are is also disclosed.

2 Claims, 3 Drawing Sheets

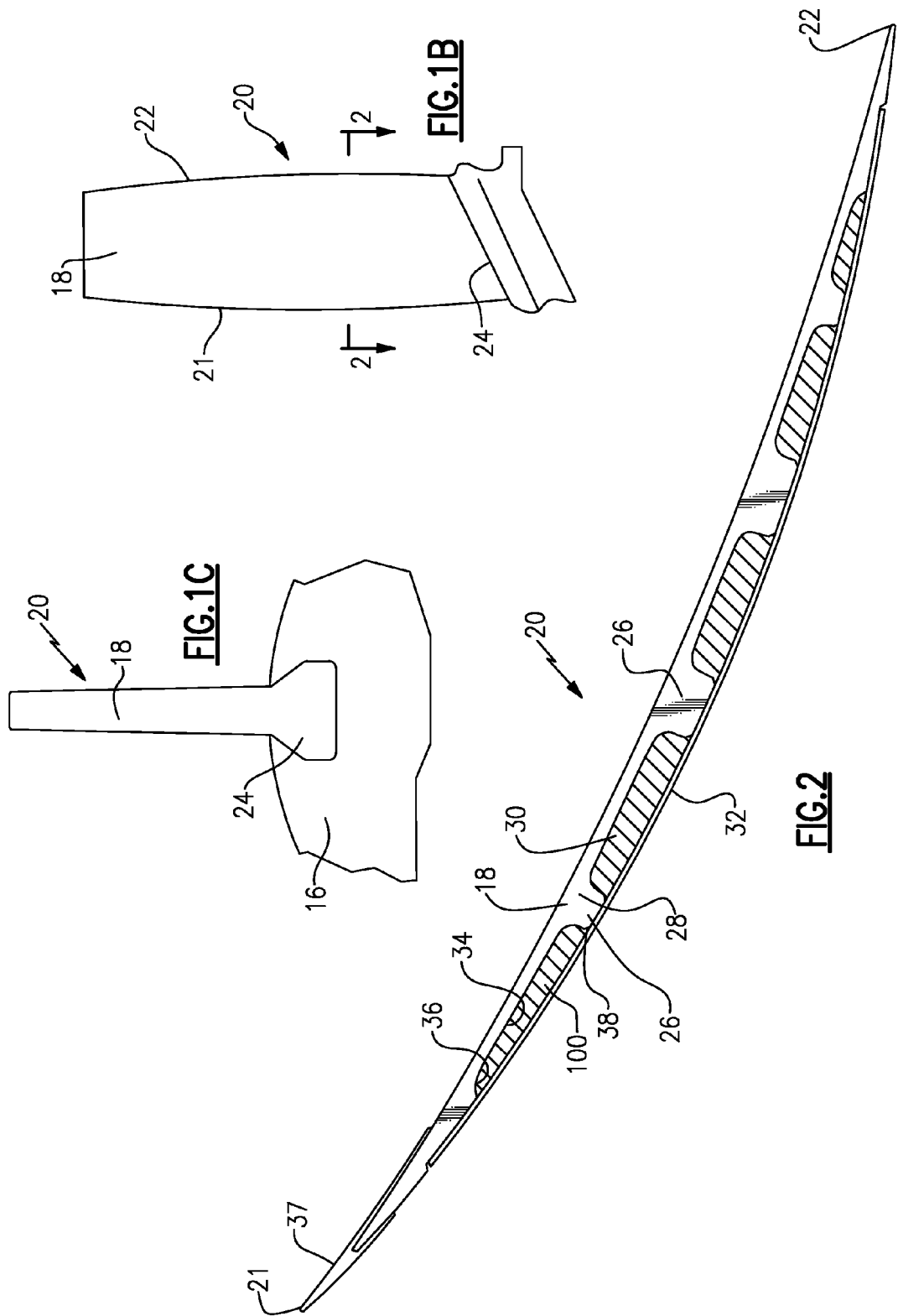

HOLLOW FAN BLADE TUNING USING DISTINCT FILLER MATERIALS

BACKGROUND OF THE INVENTION

This application relates to a hollow fan blade for a gas turbine engine.

Gas turbine engines may be provided with a fan for delivering air to a compressor section. From the compressor section, the air is compressed and delivered into a combustion section. The combustion section mixes fuel with the air and combusts the combination. Products of the combustion pass downstream over turbine rotors which are driven to rotate and in turn rotate the compressor and fan.

The fan may include a rotor having a plurality of blades.

One type of fan blade is a hollow fan blade having a plurality of channels defined by intermediate ribs in a main fan blade body. An outer skin is attached over the main fan blade body to close off the channels. The blades are subject to a number of challenges, including internal stresses that vary along the length of the fan blade.

It is known to include stiffening filler materials into the channels. The stiffening materials may be honeycomb, corrugated or metal foam.

SUMMARY OF THE INVENTION

An embodiment addresses a fan blade that includes, among other possible things, a main body extending between a leading edge and a trailing edge. Channels are formed into the main body, with a plurality of ribs extending intermediate the channels. The fan blade has a dovetail, and an airfoil extending radially outwardly from the dovetail. Material is deposited within the channels, with one type of material being selected to provide additional stiffness to the fan blade, and a second type of material being selected for having good damping characteristics.

In a further embodiment of the forgoing fan blade, at least one of the channels may extend into the main body to a closed end, from an open end.

In another further embodiment of either of the forgoing fan blades, the fan blade may additionally or alternatively include a cover skin bonded to at least one of the ribs.

In another further embodiment of any of the forgoing fan blades, the cover skin may cover the open end of the at least one channel.

In another further embodiment of any of the forgoing fan blades, the first material may be utilized in a channel adjacent radially inner locations, while said second material may be utilized within the same channel at radially outer locations.

In another further embodiment of any of the forgoing fan blades, at least one of the channels may include only said first material.

In another further embodiment of any of the forgoing fan blades, at least one other of the channels may include only said second material.

In another further embodiment of any of the forgoing fan blades, the second material may be a rubber foam.

In another further embodiment of any of the forgoing fan blades, the first material may be a metal foam.

In another further embodiment of any of the forgoing fan blades, a node may be identified on an area of bending concern along said airfoil, and said second material may be included in at least one of said channels at a location selected to support said airfoil at said node.

In another further embodiment of any of the forgoing fan blades, the first material may be both radially outwardly and radially inwardly of the second material in the channel associated with the node.

In another further embodiment of any of the forgoing fan blades, both the first and the second material may be of a lower density than the material forming said main body.

In another further embodiment of any of the forgoing fan blades, the first material may have a greater stiffness relative to said second material, and said second material may have better damping characteristics than the first material.

Another embodiment addresses a method of designing a fan blade that includes, among other possible steps: identifying areas within a hollow fan blade that would benefit from additional stiffening, and other areas which would benefit from additional damping; placing a damping material in channels formed within the fan blade at the locations which will benefit from additional damping; and placing a stiffening material at locations within the channel that will benefit from additional stiffness.

In a further embodiment of the forgoing method, the method may include identifying a vibrational node in the hollow fan blade, In another further embodiment of either of the foregoing methods, the method may include placing a damping material in the channels at an area associated with said node.

Another embodiment addresses a gas turbine engine that includes a fan section delivering air into a compressor section. Air is compressed by the compressor section and delivered into a combustor where it is mixed with fuel and combusted. Products of the combustion pass downstream over a turbine section. The fan section includes a plurality of fan blades which include a main body extending between a leading edge and a trailing edge, and channels formed into the main body. A plurality of ribs extend intermediate the channels. The fan blade has a dovetail, and an airfoil extending radially outwardly from the dovetail. At least two materials are deposited within the channels, with a first material selected to provide additional stiffness to the fan blade, and a second material selected for damping characteristics.

In a further embodiment of the foregoing gas turbine engine, at least one of the channels extends into the main body to a closed end, from an open end.

In a further embodiment of either of the foregoing gas turbine engines, a cover skin is bonded to at least one of the ribs.

These and other features of the invention will be better understood from the following specification and drawings, the following of which is a brief description.

BRIEF DESCRIPTION OF THE DRAWINGS

FIG. 1B shows an embodiment of a fan blade.
FIG. 1C shows another feature of the FIG. 1A fan blade.
FIG. 2 is a cross-sectional view along line 2-2 as shown in FIG. 1A.

DETAILED DESCRIPTION

Figure 1A:
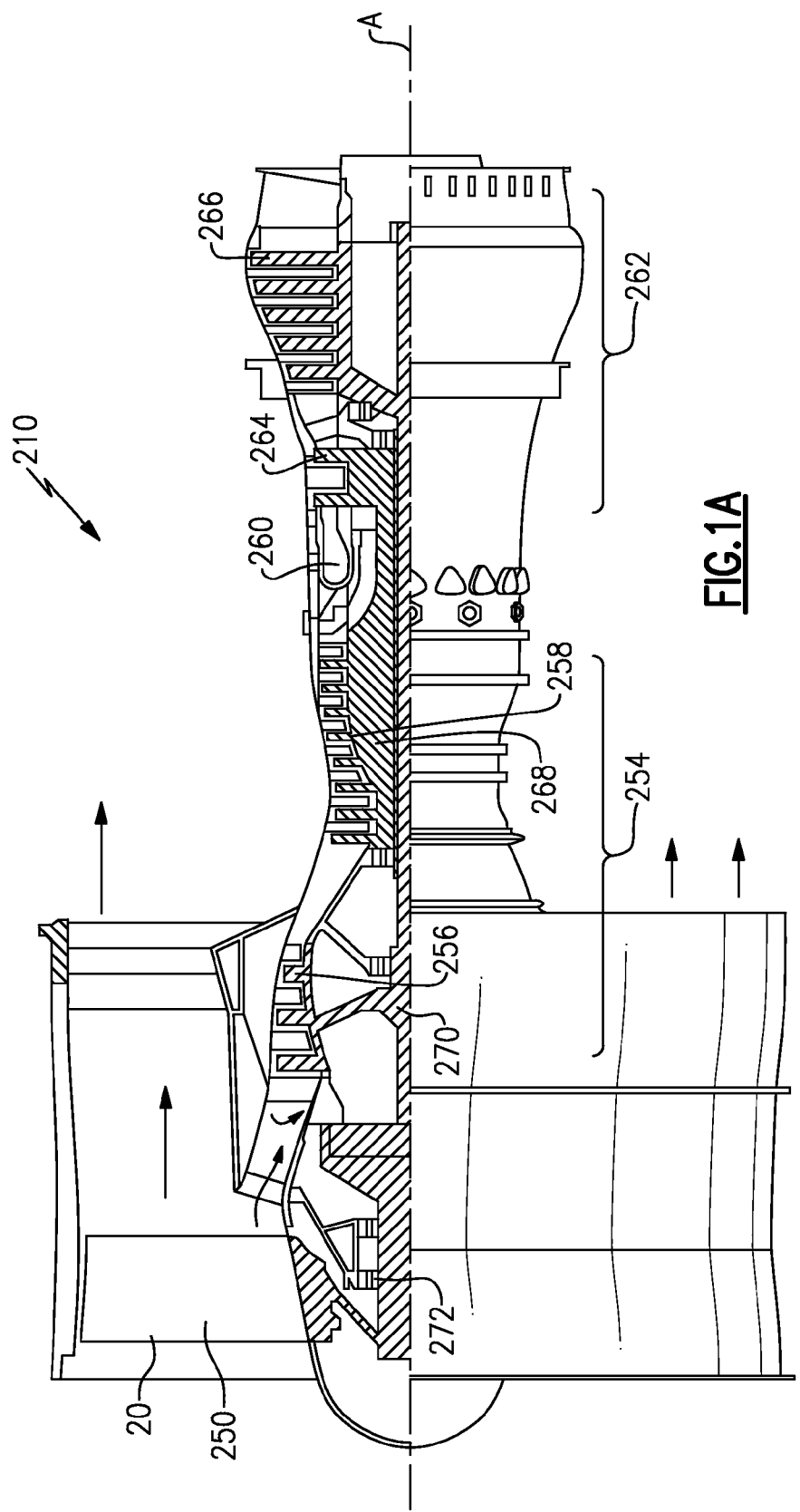
FIG. 1A shows a gas turbine engine.

A gas turbine engine 210 is shown in FIG. 1A. As shown, the engine 210 includes a fan 250 (which includes a plurality of fan blades 20), a compressor section 254 (which includes both a low pressure compressor 256 and a high pressure compressor 258), a combustor 260, and a turbine section 262 (which includes both a high pressure turbine 264 and a low pressure turbine 266). The high pressure compressor 258 is driven, via a first spool 268, by the high pressure turbine 264. The low pressure compressor 256 is driven, via a second spool 270, by the low pressure turbine 266. Also driven by the low pressure turbine 266 are the fan blades 20 of the fan 250, which fan is coupled to the second spool 270 via a gear 272.

The fan 250 delivers air into compressor section 254. Air compressed by the compressor section is delivered into combustor 260. Products of the combustion in the combustor pass downstream over turbine section 262.

A fan blade 20 is illustrated in FIG. 1B having an airfoil 18 extending radially outwardly from a dovetail 24. A leading edge 21 and a trailing edge 22 define the forward and rear limits of the airfoil 18.

As shown in FIG. 1C, a fan rotor 16 receives the dovetail 24 to mount the fan blade with the airfoil 18 extending radially outwardly. As the rotor is driven to rotate, it carries the fan blade with it. There are higher stresses in fan blade 20 adjacent to the rotor 16 then occur radially outwardly.

FIG. 2 shows a cross-section of the fan blade 20, at the airfoil 18. As shown, the leading edge 21 carries a cap 37 secured to a main body 28. A cover skin 32 closes off cavities or channels 30 in the main body 28. The main body 28, the cap 37, and the skin 32 may all be formed of aluminum or various aluminum alloys. Other materials, such as titanium, titanium alloys or appropriate metals may alternatively be utilized.

In addition, while the fan blade is shown having one cover, and the channels 30 having a closed inner end, it is also possible that the main body would provide a channel extending across its entire thickness, with covers at each side.

As shown, a plurality of ribs 26 separate channels 30 in the cross-section illustrated in FIG. 2. As shown, filler material 100 may be deposited within the channels 30. The filler material would typically be of a lighter weight than the main body 28. As will be discussed below, in this application, distinct types of filler materials are utilized across the areas of the fan blade 20. While the drawing shows the material 100 completely filling channels 30, of course it need not do so.

Figure 3:
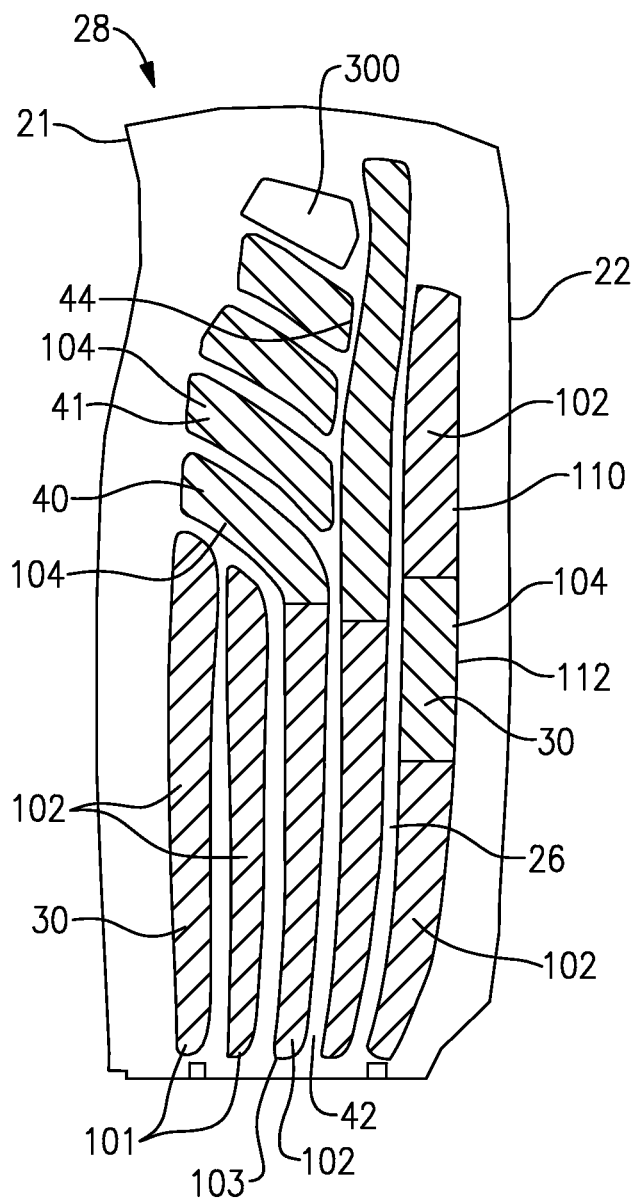
FIG. 3 shows a main body of the FIG. 1A fan blade.

FIG. 3 shows the main body 28. There are a plurality of channels 30 spaced from the front or leading edge 21 to the back or trailing edge 22, and varying from the radially inner end toward the radially outer tip. As shown, some of the channels 30 extend generally radially upwardly. Other channels, such as channel 40, bend toward the leading edge 21. Channel 41 simply extends generally from the middle of the main body 28 toward the leading edge 21.

To reduce the weight, it is desirable to maximize the amount of channels and minimize the amount of rib. However, there is also a need for additional stiffness adjacent the radially inner edge 42, to provide greater durability, and minimize blade stress.

It is also desirable to form a blade which avoids certain operational nodes across the engine operating range. Additional mass toward the tip or outer edge of the blade raises challenges against tuning away from fundamental nodes.

As can be appreciated in FIG. 2, a filler material 100 is deposited within the channel. In the prior art, the filler material has only been utilized to provide stiffness.

The present application realizes that the filler material can be provided by two distinct materials 102 and 104 as shown in FIG. 3. Thus, channels such as channel 101 which extends only for a portion of the radial extent of the main body 28 may be filled with only material 102. Material 102 may be selected to provide additional stiffness. One possible material is a metal foam such as an aluminum foam. Also, corrugated material may be used. Other channels, such as channel 103, which extends somewhat further radially outwardly may have a portion filled with stiffness material 102, but also a portion of material 104 which is selected for damping characteristics. Such a dampening material may be a rubber foam.

Channel 41 is shown provided only with the damping material 104.

In this manner, each of the channels can be provided with distinct characteristics based upon their location across the airfoil. At the radially outer ends, where damping to avoid fundamental nodes is most important, the material 104 allows a designer to achieve desired characteristics. On the other hand, at radially inner portions, where stiffness is more important, the material 102 provides greater opportunities. Of course, some channels may have no material, if appropriate. Channel 300 is an example.

Another way of utilizing the two types of material is shown in the channel 110. In this example, a node, or area of significant bending due to vibration, has been identified at the location 112. Of course, more than one node may be identified. The damping material 104 may be provided at that location, while a stiffening material 102 is utilized at radially inner and outer locations relative to area 112.

Speaking generally, this Application recognizes that there may be areas within the hollow fan blade that will benefit from each of the two types of materials. Of course, the invention would extend to three or more types of distinct materials, again each selected for the challenges raised at the particular location.

In general, materials 102 and 104 would both be significantly lighter weight or lighter density than the material of the main body 28. Thus, they do not increase the overall mass of the main body to the extent it would be increased if the main body was simply solid.

In addition, the material 102 would have greater stiffness than the material 104, and the material 104 would have better damping characteristics than the material 102. One stiffening product that could be used is Duocel aluminum foam, from ERG Aerospace Corp. An appropriate damping material is AMS-3356 silicone rubber compound. Of course, other materials can be used.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A fan blade comprising:
    a main body extending between a leading edge and a trailing edge, and channels formed into said main body, with a plurality of ribs extending intermediate the channels, the fan blade having a dovetail, and an airfoil extending radially outwardly from said dovetail; and
    there being filler material within at least some of said channels, and the filler material across the entirety of said channels including at least two different materials, with a first filler material having greater stiffness than a second filler material, and the second filler material having greater damping characteristics than the first filler material;
    a cover skin overlying the plurality of channels, and said plurality of ribs to cover an open end of the plurality of channels;
    said first material is an aluminum foam; and
    said second material is a rubber foam.

2. A gas turbine engine comprising:
    a fan section delivering air into a compressor section, air is compressed by the compressor section and delivered into a combustor where it is mixed with fuel and combusted, products of the combustion pass downstream over a turbine section; and said fan section including a plurality of fan blades, with said fan blades comprising a main body extending between a leading edge and a trailing edge, and channels formed into said main body, with a plurality of ribs extending intermediate the channels, the fan blade having a dovetail, and an airfoil extending radially outwardly from said dovetail, and at least there being filler material within at least some of said channels, and the filler material across the entirety of all said channels including at least two different materials, with a first filler material having greater stiffness than a second filler material, and the second filler material having greater damping characteristics than the first filler material;

a cover skin overlying the plurality of channels, and contacting said plurality of ribs to cover an open end of the plurality of channels;

said first material being utilized in at least one channel at radially inner locations, while said second material being utilized within the same channel at radially outer locations;

said first material is an aluminum foam; and said second material is a rubber foam.

* * * * *